UNITED STATES PATENT OFFICE.

KARL ELBEL AND IGNAZ ROSENBERG, OF BIEBRICH, GERMANY, ASSIGNORS TO KALLE & CO., OF SAME PLACE.

BROWN SULFUR DYE AND PROCESS OF MAKING SAME.

SPECIFICATION forming part of Letters Patent No. 661,907, dated November 13, 1900.

Application filed September 25, 1900. Serial No. 31,095. (No specimens.)

*To all whom it may concern:*

Be it known that we, KARL ELBEL, a subject of the King of Prussia, Emperor of Germany, and IGNAZ ROSENBERG, a subject of the Emperor of Austria-Hungary, doctors of philosophy, residing at Biebrich-on-the-Rhine, Germany, assignors to KALLE & CO., of the same place, have invented certain new and useful Improvements in the Manufacture of a Brown Cotton-Dye Containing Sulfur, of which the following is a specification.

Our invention relates to the manufacture of a new yellowish-brown substantive cotton-dye by melting a condensation product of pyridin and 1.3 dinitro 4 chlorobenzene with sodium sulfid and sulfur or with a caustic alkali and sulfur. The condensation product is obtained by heating 1.3 dinitro 4 chlorobenzene with a molecular proportion of pyridin in presence of sodium carbonate or an excess of pyridin on the water-bath. The manner in which the condensation is carried out we describe by the following two examples:

Example 1. Twelve kilos of dinitrochlorobenzene are gradually added to a solution of six kilos of pure pyridin in three hundred and twenty liters of water, which is kept at 70° to 80° centigrade and which is strongly agitated. The mixture is then kept six hours at this temperature, always stirring well. After this time the dinitrochlorobenzene is totally absorbed and only a small quantity of a black resinous by-product remains undissolved. After filtration the clear solution is rendered strongly alkaline by addition of sodium carbonate and heated for about two hours to a temperature of 80° to 90° centigrade. After this time the formation of the condensation product and its separation in a crystalline state, allowing easy filtration, is finished. After filtration the new product is pressed and dried.

Example 2. Forty kilos of dinitrochlorobenzene are dissolved in eighty kilos of pyridin and heated on the water-bath while stirring well until the mixture has become almost solid by a separation of colorless crystals, which is the case after about an hour. After cooling the mass is stirred up with seven hundred and fifty liters of water. A small quantity of unchanged dinitrochlorobenzene and of a resinous by-product being removed by filtration, five hundred liters of a ten-per-cent. soda solution are added to the filtrate. The fine brown precipitate obtained in this manner is transformed by about two hours' heating on the water-bath into a crystalline state, allowing easy filtration. The new product is filtered, washed with cold water, pressed, and dried.

By both methods above described a small quantity of a second condensation product is formed. It remains in the last mother-liquor, from which it may be precipitated by addition of common salt as a yellow crystalline precipitate which is easily soluble in water.

The main product obtained when working according to example 1 or 2 is a red crystalline powder. Sometimes it represents crystalline leaflets with a bright steel-blue luster. It is insoluble in water, in acids, or alkalies, and in ether, benzene, chloroform, and other organic solvents. It may be recrystallized only from hot alcohol, acetone, or glacial acetic acid. It fuses at 172° to 173° centigrade under simultaneous decomposition. The manufacture of the coloring-matter is carried out in the following manner:

Example: Twenty-five kilos of the condensation product are stirred into a melted mixture of ninety kilos sodium sulfid and thirty kilos sulfur. The temperature of the melt is then raised to about 120° to 130° centigrade, always stirring well. When the melt begins to turn tough, it is spread on iron plates and put into a stove previously heated to about 140°. The temperature is raised within six hours up to 180°. The melt is then perfectly dry and friable and may directly be employed for dyeing cotton.

The new dyestuff is a dark-brown powder easily soluble in water with yellowish-brown color, less soluble in hot alcohol with greenish-yellow color. The color of the aqueous solution turns darker on addition of caustic soda. Hydrochloric acid causes a brown precipitate when added to the aqueous solution. Common salt precipitates the coloring-matter completely, even from dilute aqueous solutions. Concentrated sulfuric acid dissolves the new dye with yellowish-brown color. In benzene it is insoluble. The new product dyes cotton from a bath made up with salt and sodium sulfid yellowish-brown shades which are very fast to washing and to the action of light, acids, and alkalies. By a subsequent treatment with sodium bichromate and acetic acid the shade is scarcely altered.

Now what we claim is—

1. The manufacture of a new substantive yellowish-brown cotton dye by acting on 1.3 dinitro 4 chlorobenzene with pyridin and soda and by fusing the so-obtained condensation product together with sodium sulfid and sulfur substantially as described.

2. The new sulfur dyestuff easily soluble in water with yellowish-brown color, less soluble in alcohol with greenish-yellow color, soluble in concentrated sulfuric acid with yellowish-brown color, which is precipitated from its aqueous solution by hydrochloric acid or common salt as a brown precipitate, which dyes unmordanted cotton from a bath made up with salt and sodium sulfid yellowish-brown shades, and which is obtained by acting on 1.3 dinitro 4 chlorobenzene with pyridin and soda, and by fusing the so-obtained condensation product with sodium sulfid and sulfur substantially as described.

In testimony whereof we have signed our names to this specification in the presence of two subscribing witnesses.

KARL ELBEL.
IGNAZ ROSENBERG.

Witnesses:
JEAN GRUND,
FRANZ HASSLACHER.